May 12, 1925.  1,537,669
C. R. GRIFFITH
METHOD OF MAKING CANDY SHELLS
Filed Dec. 5, 1923
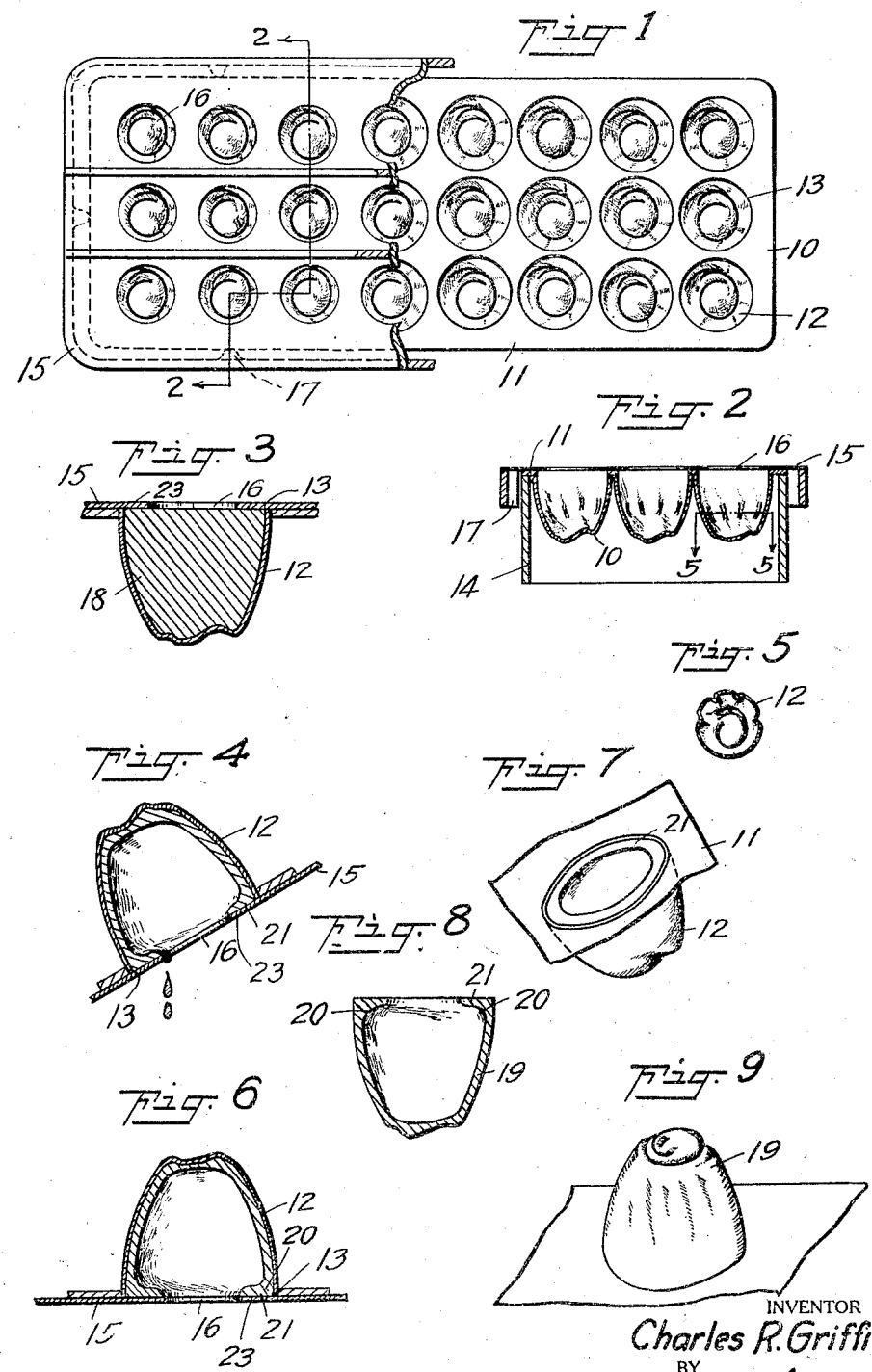
INVENTOR
Charles R. Griffith
BY
Harry Jacobson
ATTORNEY Patented May 12, 1925.

1,537,669

UNITED STATES PATENT OFFICE.

CHARLES R. GRIFFITH, OF NEW YORK, N. Y.

METHOD OF MAKING CANDY SHELLS.

Application filed December 5, 1923. Serial No. 678,721.

*To all whom it may concern:*

Be it known that I, CHARLES R. GRIFFITH, a citizen of the United States, residing at the city of New York, in the county and State of New York, have invented certain new and useful Improvements in Methods of Making Candy Shells, of which the following is a specification.

This invention relates to confections, and particularly to chocolate candy shells adapted to have centers of material other than chocolate inserted therein.

Hollow confections having a chocolate outside surface and contents of hard or pasty material such as nuts, fruits, or confectioner's cream, have been made by first making the contents or centers of sufficient consistency to allow the handling thereof, and then dipping said centers into molten chocolate whereby the centers are entirely covered with a chocolate coat. Chocolate covered confections having liquid, syrup or other types of viscous centers cannot be made at all by the above described process, which has the additional disadvantage, that it must be carried out manually, largely by highly skilled labor, and is therefore expensive. To reduce the expense incident to hand dipping and handling by skilled operators, attempts have been made to manufacture a chocolate covering or shell first, and then to fill said shell with whatever material of which the contents are to consist. Previous attempts to accomplish this end have been uniformly unsuccessful, because the shells, and the method of making them, are defective in numerous respects as will appear hereinafter.

To attain the various objects of this invention which will appear from what follows, I have illustrated the preferred embodiment of my invention in the accompanying drawing, in which—

Fig. 1 is a top plan of my improved gang mold for making a number of my improved shells, the cover plate being illustrated, partly broken away to expose the underlying individual forms. Fig. 2 is a vertical section of the same on the line 2—2 of Fig. 1. Fig. 3 is a vertical section of an individual form as it appears after molten chocolate has been poured thereinto and the cover placed thereon. Fig. 4 is a similar view of the same as the form appears during one of the steps of my improved process, wherein the mold is being inverted. Fig. 5 is a horizontal section of one of the forms on the line 5—5 of Fig. 2. Fig. 6 is a vertical section similar to Fig. 4 showing the mold and the shell, after the surplus chocolate has been drained, and said shell is ready to set. Fig. 7 is a perspective view of one of the forms and shell as it appears during the process of turning the mold into the initial position thereof. Fig. 8 is a vertical section of the finished shell, and Fig. 9 is a perspective view of the same.

In the practical embodiment of my invention, I employ preferably a gang mold as 10 wherein an upper flat surface 11 is provided and wherein a series of similar forms as 12 are suitably secured preferably in spaced relation to each other. The upper rim 13 of each of said forms 12 is made sharp for the purpose which will be pointed out hereinafter.

Suitable vertical walls as 14 secured to the upper face 11 of the mold may be used as a stand so that said mold may be rested on a working table, not shown, at a suitable working height.

A flat cover plate 15 having openings 16, therein arranged with the same distance between centers as there is between the centers of the forms 12, is adapted to be placed on the flat surface 11 of the mold 10 and when so placed is in close contact with the surface 11, and thereby prevents any molten chocolate from reaching said surface when said plate is on the mold. Said openings 16 are preferably substantially smaller in diameter than the upper rim 13 of the forms. Guide lugs as 17 engaging the walls 14 are preferably provided to locate said openings in proper operative position relatively to said forms 12.

My improved mold is used as follows: The cover plate having been removed from the mold 10 (right half of Fig. 1) molten chocolate as 18 is poured into the form 12 until said chocolate fills said form completely. The cover plate 15 is then placed on said mold 11, being guided into proper registration by means of the lugs 17 engaging the walls 14. It will be seen that no chocolate can flow between the cover plate 15 and the face 11 of the mold because of the close contact between said plate and said face (Fig. 3). The filled mold together with the cover plate are then inverted (Fig. 4) whereupon that part of the molten chocolate which has not stuck to the inner surface of the form 12 and the plate 15 is drained off through the opening 16 (Figs. 4 and 6). However, sufficient chocolate does stick to the form and to the plate to form a shell 19 substantially thicker at the point 20 thereof nearest the rim 13 than at any other portion of the shell, due to the supporting effect on the chocolate, of the rim 23 of that part of the plate between the circumference of the opening 16 and the rim 13. The mold is allowed to remain in its inverted position until all the superfluous chocolate has drained from the form and is then re-inverted back to its initial position after which the mold is preferably cooled to hasten the setting of the shell.

It is well known that during the setting or cooling process chocolate shrinks a substantial amount depending on the amount of chocolate used. It will be understood that the greater the thickness of the chocolate the greater is the shrinkage thereof in setting. I take advantage of this characteristic of chocolate by making my improved shell of substantial thickness throughout. Sufficient shrinkage therefore takes place to cause said shell to withdraw from the form wherein it is cast for practically the entire surface thereof. It will be understood that while chocolate is the preferred material for the shell, any other material having the properties described, may be used if desired.

In means and processes wherein no cover plate is used, the form is inverted to drain off the molten chocolate, and then re-inverted for setting, the thickness of the resulting shell is ordinarily least at or near the rim 13, at the point however, where the thickness of my improved shell, is greatest. The result of previous attempts to manufacture shells, is that practically no shrinkage takes place at or near the rim, and that the removal of the shell from the form without damage to said shell is practically impossible, because of the adherence of the thin rim of the shell to the form.

The use of my improved cover plate also causes a horizontal base as 21 of an inner diameter substantially that of the opening 11 to be formed on the shell. Said base makes the sealing of said shell after the contents have been inserted much simpler and easier than is possible in a shell where no base is provided.

By making the rim 13 of the form 12 sharp, I am enabled to form a perfect shell without unsightly flanges of waste material projecting outwardly therefrom as would be the case were the corner 13 rounded to any extent and the chocolate allowed to flow over the rim.

After the chocolate has drained sufficiently from the form 12, (Fig. 6) the mold containing the shells, together with the cover plate is again inverted back to its initial position and the shells allowed to set (Fig. 7). The cover plate is then readily removed after first tapping said plate to jar the base 21 of the shell loose from said plate, it being well known that chocolate after setting may be easily separated from material to which it sticks when molten.

The finished shells may then be removed from the mold by first inverting and then tapping the mold to jar the shells loose, whereupon said shells drop out (Fig. 9) without difficulty, due particularly to the fact that my improved shell is formed with a sufficient thickness of material throughout to allow the finished shell to shrink away from the form into which it is cast.

It will be seen that I have provided a rapid method of making said shell, and that said method may be rapidly and efficiently carried out by inexpensive unskilled labor.

I claim:

1. The method of making a chocolate shell consisting of pouring molten chocolate into a mold, placing a cover having an opening therein of less diameter than that of the open end of said mold over said mold, inverting said mold with said cover and allowing the greater part of the molten chocolate to drain from said mold, re-inverting said mold and cover, allowing the chocolate to set, removing said cover, and removing the shell from said mold.

2. The method of making a hollow chocolate shell, having an opening in the base thereof comprising casting a molten chocolate shell in the same manner as though it were to be made solid, and inverting the casting while allowing said casting to drain only near the center thereof.

3. The method of making a hollow chocolate shell comprising the casting of a molten chocolate shell as though it were a solid confection, and inverting the molten casting while at the same time allowing said casting to drain through an opening less in diameter than that of the outer edge of the base of said casting.

4. The method of making a hollow candy shell, consisting of melting the candy by heat, casting said molten candy as though the shell were to be solid, inverting the molten casting while allowing said casting to drain through an opening of less diameter than that of the base of said shell, re-inverting said casting after the draining is completed, and allowing said casting to freeze.

5. The method of making a hollow candy shell, consisting of melting the candy by heat, casting said molten candy as though the shell were to be solid, inverting the molten casting while allowing said casting to drain through an opening of less diameter than that of the base of said shell, re-inverting said casting and allowing said casting to freeze while allowing the formation of inwardly extending flanges on the base of said shell, and preventing the formation of outwardly extending flanges on said base.

6. The method of making a hollow candy shell consisting of melting the candy by heat, casting the molten candy as though the shell were solid, inverting the molten casting while allowing said casting to drain through an opening of less diameter than that of the base of said shell, the draining being accomplished in such manner that the thickness of said shell becomes substantially greater near the outer edge of the base than elsewhere in said shell.

CHARLES R. GRIFFITH.